(12) United States Patent
Phillips

(10) Patent No.: US 10,938,292 B2
(45) Date of Patent: Mar. 2, 2021

(54) MAGNETIC LUBRICANT

(71) Applicant: Energystics, Ltd., Glen Cove, NY (US)

(72) Inventor: Reed E. Phillips, Glen Cove, NY (US)

(73) Assignee: ENERGYSTICS, LTD., Glen Cove, NY (US)

( * ) Notice: Subject to any disclaimer, the term of this patent is extended or adjusted under 35 U.S.C. 154(b) by 0 days.

(21) Appl. No.: 17/002,120

(22) Filed: Aug. 25, 2020

(65) Prior Publication Data

US 2020/0389081 A1   Dec. 10, 2020

Related U.S. Application Data

(62) Division of application No. 16/432,542, filed on Jun. 5, 2019, now abandoned.

(51) Int. Cl.
*H02K 35/02* (2006.01)
*H02K 44/08* (2006.01)

(52) U.S. Cl.
CPC .................................. *H02K 44/085* (2013.01)

(58) Field of Classification Search
CPC ...... H02K 35/02; H02K 7/088; H02K 447/00; H02K 44/085
See application file for complete search history.

(56) References Cited

U.S. PATENT DOCUMENTS

| | | | | |
|---|---|---|---|---|
| 2,851,136 A | * | 9/1958 | Sussebach | F16D 37/02 192/21.5 |
| 4,758,275 A | * | 7/1988 | Yubakami | H01F 1/44 106/31.28 |
| 6,563,244 B1 | * | 5/2003 | Yamauchi | F16C 32/0459 310/154.02 |
| 6,833,780 B2 | * | 12/2004 | Cheung | F16C 32/0637 335/302 |
| 6,982,501 B1 | * | 1/2006 | Kotha | B82Y 25/00 310/10 |
| 2003/0155827 A1 | * | 8/2003 | Cheung | H02K 35/02 310/90.5 |
| 2009/0084646 A1 | * | 4/2009 | Browne | F16F 9/537 188/267.2 |

* cited by examiner

*Primary Examiner* — Dang D Le
(74) *Attorney, Agent, or Firm* — Tutunjian & Bitetto, P.C.

(57) ABSTRACT

A linear energy generator includes a field coil array that has one or more coils of wire, contained within a sealed generator housing and wrapped around a tube. A permanent magnet array is positioned within the tube and includes magnets that move relative to the field coil array to generate electricity. A magnetic lubricant is used between the tube and the permanent magnet array. The magnetic lubricant includes a solid phase component that includes ferromagnetic particles and a liquid phase component that coats the ferromagnetic particles to prevent corrosion and to improve lubricity of the solid phase component.

15 Claims, 2 Drawing Sheets

MAGNETIC LUBRICANT

BACKGROUND OF THE INVENTION

The present invention relates to lubricants for use in sealed energy generation systems and, more particularly, to magnetic lubricants that use pure iron particles to provide magnetic properties for a lubricant.

Omnidirectional wave energy converters can capture the moving kinetic energy of ocean waves that impinge on the device from any direction and can convert that captured mechanical energy into electrical energy for transmission to an electrical grid system. Such wave energy converters (WECs) use the Faraday Linear Electric Generator (LEG), which in its simplest form is a linear arrangement of a block of magnets that is moved through a static set of coils in response to the vertical motion of the waves impinging on the WEC. Alternatively, the magnets can be stationary, and the bank of coils can be moved in response to the ocean wave vibrations.

In either case, the relative motion of the magnets against the field coil array (FCA), which is the armature of the generator where electrical power is induced as per Faraday's Law of Induction, will convert the mechanical energy of that motion into an electrical current in the coils. The frame of reference for the generator is its housing. If either the coils or the magnets move relative to the housing, they form the rotor of the generator, and if either the coils of the FCA or the magnets are fixed relative to the housing, they would form the stator of the generator. Hence, in some versions of the LEG, the coils are the stator and the magnets are the rotor, and in other versions, the magnets are the stator and the coils are the rotor. The part of the generator that produces the electrical power is called the armature, and that is always the coils of this kind of generator.

WECs can be totally submerged for years on end. This helps protect the WECs from storm damage. However, the WEC is then at risk from the entrance of seawater. If even a minute amount of seawater can result in the complete destruction of the generator and the WEC. While specialized seals and stuffing boxes have been developed to help prevent this problem with boats, these devices have to be replaced every 3 to 5 years because of corrosion and deterioration of the packing materials employed that keep the water out. While this may be acceptable for boats, it is not suitable for WECs situated far out into the ocean. From a maintenance standpoint, it would be economically unfeasible to repair seals and stuffing boxes in remote locations so frequently.

BRIEF SUMMARY OF THE INVENTION

A linear energy generator includes a field coil array that has one or more coils of wire contained within a sealed generator housing and wrapped around a tube. A permanent magnet array is positioned within the tube and includes magnets that move relative to the field coil array to generate electricity. A magnetic lubricant between the tube and the permanent magnet array includes a solid phase component that includes ferromagnetic particles and a liquid phase component that coats the ferromagnetic particles to prevent corrosion and to improve lubricity of the solid phase component.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Figure 1:
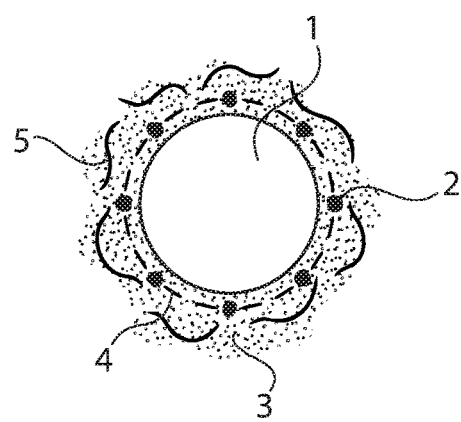
FIG. 1 is a cross-sectional view of a ferromagnetic particle in a liquid matrix to make up a magnetic lubricant in accordance with an embodiment of the present invention.

Embodiments of the present invention provide magnetic lubricants that are suitable for use in hermetically wave energy converters (WECs) that are suitable for long-term use without maintenance or replacement. The present embodiments use lubricants that include particles of pure iron, which provide strong magnetic properties, combined with a lubricating and protective liquid component that prevents corrosion of the iron particles and provides long-term lubricity.

Water can be prevented from entering into a generator by sealing in the generator from the water so that it is totally and hermetically sealed. Such seals also prevent any humidity from diffusing. In an exemplary structure of a linear energy generator (LEG), the mechanical energy is coupled to a moving magnetic component on the exterior of the generator called an external rotor component. The moving magnetic component is magnetically coupled to and attracted to the moving magnet rotor within the generator, called the internal rotor component.

With such an arrangement, the mechanical energy of the ocean waves is transferred first to the moving external magnetic component of the rotor of the generator that is external to the generator housing. When that external rotor component of the generator moves, due to the strong magnetic fields between the external rotor component and the actual rotor within the generator housing, the internal rotor component, movement of the external rotor component will cause a synchronous movement of the internal rotor component through the coils, thereby producing electricity. The need for a cable, a shaft, or any other type of mechanical drive linkage that enters, and thus compromises the integrity of the generator casing against water, is thereby completely eliminated. Once such a generator is constructed and deployed for use, it can have a very long operating lifetime, without the need for any of the components of the generator to be replaced.

However, lubrication of the moving rotor in the generator is challenging. Lubrication not only increases the efficiency of the generator's electrical production by decreasing frictional forces, but also reduces wear and tear of the rotor and the tube in which it slides. Furthermore, the hermetic sealing of the generator means that lubrication can be introduced into the generator only on one initial application, prior to the sealing of the generator and its deployment in the ocean.

From that point, the generator can never be again lubricated during its entire operational life without expensive and time-consuming removal of the device from the ocean and subsequent maintenance to seal the generator and re-lubricate the device.

Thus, embodiments of a submergible LEG use a lubricant that is magnetic in nature and has two components—a non-magnetic component and a magnetic component. The magnetic component incorporates pure iron particles suspended in a matrix of non-magnetic materials that form the non-magnetic component of the lubricant.

The non-magnetic component(s) of the lubricant are selected according to several criteria. First, the non-magnetic component should be completely non-volatile and non-evaporative over many years to ensure that the original viscosity suitable for the generator remains constant.

Second, because these generators may be placed in a vertical position, the tendency of the lubricant to gradually migrate downward under the force of gravity along the interior walls of the generator tube, to collect at the bottom of the generator, should be prevented, because the sealed generator is difficult to re-lubricate after its initial lubrication. Dry lubricants also tend to migrate down the walls of the generator.

Third, the lubricant should have a low coefficient of friction and be compatible with magnets that are coated with a polytetrafluoroethylene (PTFE) coating.

Fourth, the lubricant should be chemically stable and totally chemically inert over the anticipated operating lifetime of the generator.

Fifth, the lubricant should not be compressible into a solid mass by the effect of the magnetic field emanating from the generator magnets. This necessitates a the ratio between the liquid phase component of the lubricant and the percentage by weight of the iron particles of the solid phase component of the lubricant to be within certain limits.

Sixth, the lubricant should include a two-phase component so that a particulate solid phase component can roll around in the liquid phase component to reduce the coefficient of friction between the sliding magnets and the slide tube in which the magnets slide, whether the tube is made of plastic, metal alloys, or carbon fiber/composite. The ratio of the solid phase to liquid phase components should be such as to provide the proper viscosity to allow proper lubrication, while at the same time preventing dripping or flowing of the lubricant with time toward the bottom of the generator.

Seventh, the lubricant should provide a favored, low magnetic resistance path (e.g. a low reluctance path) for the magnetic field lines emanating out of the permanent magnet array (PMA) of the generator and crossing the field coil assembly to improve the efficiency of mechanical-to-electrical energy conversion.

Eighth, though the lubricant will not need to operate at a high temperature, or at a high frequency of oscillation, there may be situations where the LEG can be used at a significantly higher temperature and frequency of oscillation, for example if the generator is driven by a linear fossil fuel, steam, or heat engine.

Ninth, the lubricant should be capable of operating in a complete vacuum or in an inert gas atmosphere within the interior of the generator, an environment in which conventional graphite lubricants act very poorly.

Tenth, the lubricant should collect any small particles that abrade off from the sliding surfaces during operation and prevent them from increasing frictional forces. The lubricant itself should have its lubricity unaffected by the collection of these particles.

Eleventh, the lubricant should be suitable to operate with rare earth magnets that have a coating of PTFE on them and should take advantage of the inherent low coefficient of friction of the PTFE coating of these magnets.

Twelfth, the lubricant should prevent oxidation by oxygen and water vapor and corrosion of the iron particles into red rust. The corrosion and deterioration of the iron particles into red rust would damage the generator.

Thirteenth, the lubricant should convert the abrasive nature of pure iron particles into a lubricating particle.

These different criteria establish a stringent set of needs. The present embodiments solve many of these problems by using a lubricant that is magnetic. The magnetic lubricant thereby clings to the magnetic poles of the permanent magnet array in the generator. The two-phase lubricant described herein includes a non-magnetic liquid lubricant that is dispersed through a suspension of magnetic particles that cling to the magnetic pole regions, producing localized areas of high "magnetic viscosity," so that the lubricant will not drip vertically downward to the bottom of the generator. The solid phase component of the lubricant can also include other particles that enhance the performance of the lubricant by enhancing its lubricity for any sliding surface within the generator, no matter what the materials of that sliding surface were.

However, incorporating magnetic particles into the fluid phase presents new challenges. Many magnetic materials are unsuitable for use in an LEG of reasonable size for several reasons. First, they have weak magnetic properties, with both low permeability and high magnetic reluctance. Second, ultra-small particle sizes cannot conduct the magnetic field very well out of the magnets and across the air gap to the coils. Third, conventional organic solvents tend to evaporate over time. Fourth, conventional ferrofluids are difficult to work with and it is difficult to put a large quantity of them into the interior of a generator to completely fill up the cavity of an LEG.

Fifth, ferrofluids are messy, especially if the generator has to be opened for maintenance and the material has to be removed from the generator. These fluids permanently stain everything they contact. Sixth, its economic cost is significant. Seventh, it has a tendency over time for the surfactant constituent to lose its anti-clumping property, causing the particles to coalesce into larger lumps and fall out of solution, effecting the fluid's magnetic properties and viscosity over time. Eight, it is difficult to make ferrofluid go where it is needed, and it is easy for the magnetic flux lines to be shorted out to the adjacent magnetic poles rather than being conducted through the coils.

Exemplary ferromagnetic particles suitable for use in the present embodiments include spherical, ellipsoid, or oblate spheroidal particles formed from pure iron and having with smooth surfaces that are large enough to be efficient in conducting and directing a magnetic field. The material should be lubricating in nature, rather than abrasive, and yet small enough to remain in suspension when the magnet PMA is not in the near vicinity.

In some embodiments, pure iron particles can be used to conduct and direct magnetic fields, because the relative magnetic permeability of pure iron (e.g., above about 99.8%) is 5000, which is 10 to 30 times greater than most ferrites or magnetite, which have relative permeabilities of a few hundred or less. Iron particles with higher purity (e.g., above about 99.95%), annealed in hydrogen, can have a relative permeability of 200,000 or up to 1200 times greater. This greater permeability and larger particle size makes the attraction of the lubricant to the magnets much stronger, keeping the lubricant constantly in the vicinity of the poles of the PMA, so that its surface is constantly lubricated against the wall of the sliding chamber.

In addition, the lubricant does not migrate and drop away from the sliding tube PMA interface or slowly descend under the force of gravity to the bottom of the generator, which would compromise the lubricant's lubricity where it is needed. However, pure iron particles are subject to oxidation corrosion, while ferrites and magnetite are not because they are already oxidized. For this reason, pure iron particles have not heretofore been used in lubricants to make them magnetic, because their quick deterioration and destruction to red rust when exposed even to minute amounts of oxygen and water vapor renders them unsuitable for most lubrication applications.

To use iron particles in a lubricant, the present embodiments overcome various challenges. Iron particles quickly lose their ferrimagnetism when they are exposed to oxygen and air because of the rapid formation of crumbly $Fe_2O_3$. When exposed to humidity as well, there is an accelerated destruction of the particles into the common observed hydrated form of rust, red rust, which is a mixture of $Fe_2O_3$-$nH_2O$ and iron (III) oxide-hydroxide (FeO(OH), Fe(OH)$_3$). This will destroy the magnetic properties of the lubricant, destroy its lubricity, and initiate a rusting oxidation reaction that can initiate further damage to the generator itself, such as the magnets, which can decompose quickly to red rust as well. In addition, iron particles are an abrasive, not a lubricant, and when used in a lubricant in particle size above 500 nm can decrease lubricity of the lubricant and increase frictional forces and wear and tear on the magnet sliding surfaces. The presence of iron particles in a lubricant has conventionally been regarded as a deleterious contaminant, undesirably affecting and reducing the lubricity of the lubricant and resulting in increased wear and tear of the lubricating surfaces.

To overcome these challenges, the present embodiments include a magnetic lubricant that is designed to be used in vertically oriented, hermetically sealed, permanently submerged LEGs that perform energy conversion in WECs. The lubricant includes nano-scale spheroidal, ellipsoidal oblate spheroidal nanoparticles of pure iron. The iron particles are coated with a liquid polymer that prevents the iron from oxidizing. The liquid polymer also varies the viscosity, density, rate of flow, and sheer rate of the lubricant.

To increase the lubricity and decrease the coefficient of friction of the lubricant, additional materials such as powdered PTFE can be added to coat the iron particles, changing them from abrasive materials to lubricating materials and enhancing the boundary lubricating effects of the iron particles at the interface between the iron particles and the magnets of the LEG. Additional particular components, such as graphene nanoplatelets, molybdenum disulfide, and/or non-cubic boron nitride can be added to further decrease the coefficient of friction at the boundary layer between the sliding tube and the PMA of the generator by producing a layering and rolling action with the iron particles and the PMA surface.

The present embodiments furthermore use a lubricant that is designed to remain concentrated in the areas of the magnet sliding tube beneath the PMA and its magnetic poles and not to migrate under the force of gravity to the bottom of the generator. The lubricant conducts the magnetic field perpendicularly from the PMA across the air gap and into the nearby FCA, facilitating the induction of electrical energy in the coils.

To achieve these goals, the present embodiments employ a lubricant that is based on substantially pure iron nanoparticles. It is specifically contemplated that the iron nanoparticles may have a purity of at least 99%, to avoid impurities that might cause chemical reactions that degrade the integrity of the nanoparticles. It is specifically contemplated that the iron nanoparticles may have a largest dimension between about 500 nm and about 3000 nm. Although larger particles contain more iron and would thus lead to a greater attractive force between the lubricant and nearby magnetic fields, the large size would result in a material that is too abrasive to have a sufficiently low coefficient of friction on adjacent surfaces. As the particle size is decreased, the abrasive properties of iron tend to become lubricating properties. However, if the particles are made too small, for example about 10 nm, their ability to conduct a magnetic field becomes too small to hold the lubricant to the magnets. The iron nanoparticles are made to be smooth and round, for example with spheroidal, ellipsoidal shapes, oblate spheroidal, or approximations thereof. This ensures a minimum of friction.

As noted above, the iron nanoparticles are coated with a lubricant that is impervious to oxygen and water vapor to prevent the nanoparticles from degrading via oxidation. An exemplary coating material is polyfluoropropylene ether (PFPE), but it should be understood that other low-friction materials can be used instead.

The iron nanoparticles are separated by an inter-particle space where additives, such as graphene nanoplatelets and molybdenum disulfide are added so that the iron nanoparticles can roll over one another with low friction between iron-iron, iron-steel, and iron-plastic interfaces. Additional additives, such as PTFE powder, can be used to further decrease the coefficient of friction between the iron nanoparticles and the magnets. In particular, when the magnets are themselves coated in PTFE, contact between two PTFE surfaces is particularly low-friction when a liquid-phase lubricant is used.

In addition to the solid-phase component(s) of the lubricant, a liquid-phase medium is used and can include perfluoropolyether (PFPE) or any of a variety of other fluoropolymer oils, silicone oils, and artificial motor oils. The ratio of the concentration by weight of the solid-phase components, which include the iron nanoparticles, molybdenum disulfide, and PTFE powder, to the concentration by weight of the liquid phase component is set to be lower than a threshold value to prevent the lubricant from compacting into a hard mass if the magnetic field in the vicinity is too strong.

Referring now to FIG. 1, a cross-section of a lubricant is shown. A spheroidal nanoparticle 1 is surrounded by a liquid solid matrix lubricant whose liquid phase component can, for example, be PFPE 3 and whose solid phase components can include the lubricating particles graphene nanoplatelets (GNP) 4, molybdenum disulfide (MDS) particles 2, and PTFE particles 5. It is specifically contemplated that the nanoparticle 1 can be formed from substantially pure iron with a spheroidal, ellipsoidal, or oblate spheroidal shape or some approximation thereof. The effect of the liquid phase component of the lubricant is to keep the coefficient of friction very low between an iron particle and adjacent iron particles, between the iron particles and the PTFE coated magnets, and between the iron particles and the sliding tube for the magnets, which is part of the LEG generator housing.

The LEG generator housing can, in turn, be a non-magnetic steel alloy, a plastic or carbon composite tube, or a non-magnetic metal such as brass, copper, or aluminum.

The liquid phase component of the lubricant allows the nanoparticles 1 to roll and slide over one another. In addition, the liquid phase component prevents exposure of the nanoparticle to oxygen or water vapor or both, thereby preventing red rust destruction of the nanoparticles 1, which can destroy the lubricity of the lubricant as well as initiate corrosion in other areas of the generator such as the magnet rotor. Either GNP 4 or MDS particles 2 or both are introduced into the liquid phase component of the lubricant to further enhance the slipping, rolling, and sliding actions of the iron particles against each other and the other material interfaces that these iron particles touch. Particles of PTFE 5 can be introduced to decrease the coefficient of friction of the iron particles against the PTFE coating of the magnets.

Note that pure iron particles are contemplated as the preferred material because of iron's low economic cost, high magnetic permeability, and low reluctance to the passage of magnetic fields. However, other ferromagnetic materials, such as particles of mu-metal, permalloy, supermalloy, supermumetal, and alloys of nickel, cobalt, and iron have very high magnetic permeabilities and would work as well. It is particularly contemplated that the nanoparticles 1 can be formed from particles of hydrogen-annealed iron having an iron purity which exceeds 99.95%. Such particles may have a permeability of up to 200,000.

GNP particles 4 have superior lubricity as compared to graphite particles in the vacuum or inert gas, water vapor-free atmosphere of the interior of the hermetically sealed permanently submerged LEG. Graphite loses its lubricity when water vapor is not present, such as in a vacuum. The concentration by weight of the GNP particles 4 may range from about 0.1% to about 20%, a concentration of about 5% being particularly contemplated. The MDS particles 2 may also range in concentration from about 0.1% to about 20%, with a particularly contemplated concentration of about 5%. If both MDS and GNP particles are used, then the concentration of each can range from about 0.1% to about 20%, but the total combined percentage weight of both together should not exceed 40%.

The concentration by weight of the PTFE particles 5 may be in the range of between about 0.1% and about 10%, with a specifically contemplated concentration of 5%. The maximal concentration by weight of all the non-ferrous particulates in the lubricant should be less than about 50%. The nanoparticles 1 for this embodiment have a concentration by weight between about 10% and about 40%, with a specifically contemplated concentration of about 30%. The total solid particle phase with all solid components can then have a preferred concentration by weight between about 45% and about 90%, with the liquid phase component of the lubricant, in an embodiment that uses PFPE, would have a preferred 55% by weight concentration but could be as low as 10% by weight. The range of concentrations can range from slightly over 10% to about 90% for the solid component phase of the lubricant and a range of 90% to 10% of the liquid component phase of the lubricant.

Hence the viscosity can be varied over a range from having the lubricant being a paste, a grease, or an oil in consistency, with the preferred viscosity being such that the lubricant has the properties of a low-viscosity grease. If the viscosity is too high, the iron particles might begin to compact too tightly, impairing the lubricity of the lubricant. If the viscosity was low enough case the lubricant to take the form of an oil, the liquid phase component, and the solid phase non-magnetic component particles along with it, would have a tendency to drip down along the walls of the magnet and the magnet sliding tube to the bottom of the generator in a vertical configuration, leaving only the iron particles adherent to the magnetic poles. The sliding magnet surfaces against the wall of the sliding tube would no longer be properly lubricated.

Figures 2A, 2B:
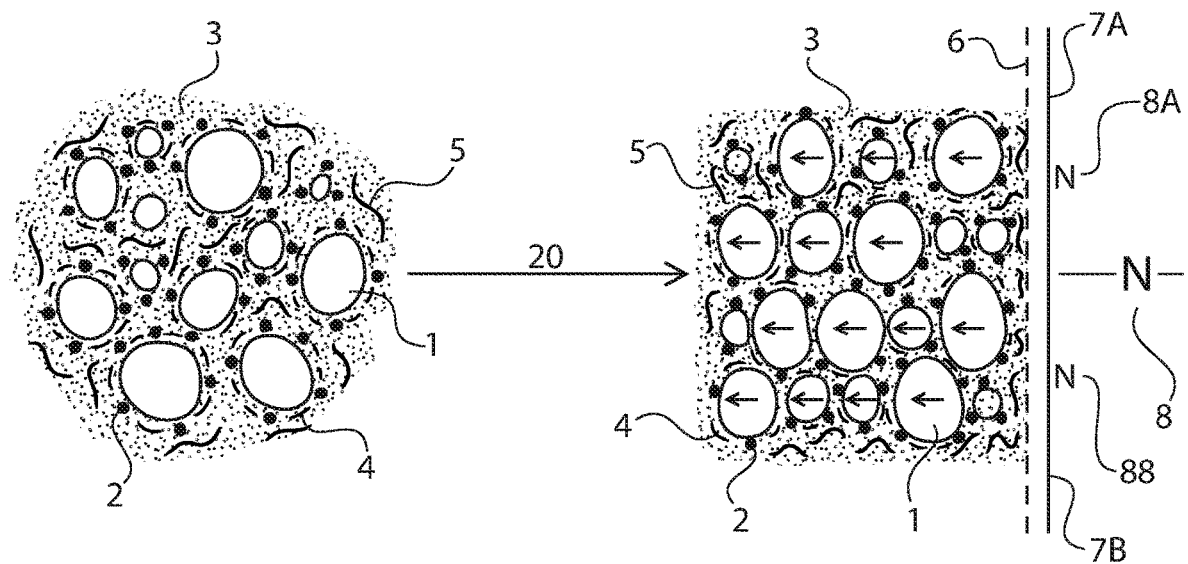
FIG. 2A is a view of a magnetic lubricant that is not positioned within a magnetic field in accordance with an embodiment of the present invention.
FIG. 2B is a view of a magnetic lubricant that is positioned within a magnetic field in accordance with an embodiment of the present invention.

Referring now to FIG. 2A, an embodiment is shown where the magnetic lubricant is not present within a nearby magnetic field. This figure depicts how the relatively larger iron nanoparticles 1 are completely surrounded by the liquid phase component PFPE 3, mixed with the non-ferrous solid particulate solid phase component consisting of GNP particles 4, MDS particles 2, and PTFE particles 5. The iron nanoparticles 1 are completely surrounded by this matrix, and in particular are completely surrounded by the liquid phase component, PFPE 3, so that no exposure to oxygen and/or water vapor would occur to the iron particles that would cause their red rust disintegration. The positional location of the iron particles in space is completely random.

Referring now to FIG. 2B, an embodiment is shown in which the magnetic lubricant is present within a nearby magnetic field. That magnetic field is indicated by an arrow 18, representing the lines of magnetic flux emanating from nearby N (north) pole 8 which is formed by two adjacent repulsive magnetic N poles 8A and 8B of rare earth magnets 7A and 7B respectively. The heavily repulsive adjacent N poles are held together by various mechanical means, and this magnetic pole arrangement produces an outward radial magnetic field that emanates out of the Permanent Magnet Array (PMA), made up of magnets 7A and 7B, through the PTFE coating 6 of the magnets, and into the magnetic lubricant.

The field lines go through the iron nanoparticles 1 and they line up in parallel rows in alignment with the field lines represented by arrow 18. Each nanoparticle 1 continues to be surrounded by the liquid phase component (PFPE 3) that contains a suspension of solid phase component particles that include GNP particles 4, MDS particles 2, and PFTE particles 5, which shields the iron particles from oxygen and water vapor induced oxidation and rust corrosion, and also allows the normally abrasive nanoparticles 1 to roll around and slide over each other, so that the nanoparticles themselves are no longer abrasive but are actually lubricating particles themselves.

The PTFE particles 5 in the matrix between the iron particles 1 that are closest to the permeant magnet array (PMA) outer cylindrical surface and that outer surface of the PMA align themselves up with the PTFE coating 6 on the PMA, with the liquid PFPE 3 between them, to produce an extremely low coefficient of friction between the iron particles that are in contact with the PMA surface. Arrow 20 shows the transformation in the spatial structure of the magnetic lubricant with the application of a magnetic field. Unlike ferrofluids that employs very tiny particles of magnetite (10 nm) and other magnetorheological fluids that employs very large particles of magnetite (several hundred microns in diameter), the present embodiments do not need any surfactant to prevent the magnetite particles from clumping. The constant agitation of the iron particles by the oscillatory movement of the PMA prevents clumping.

Figure 3:
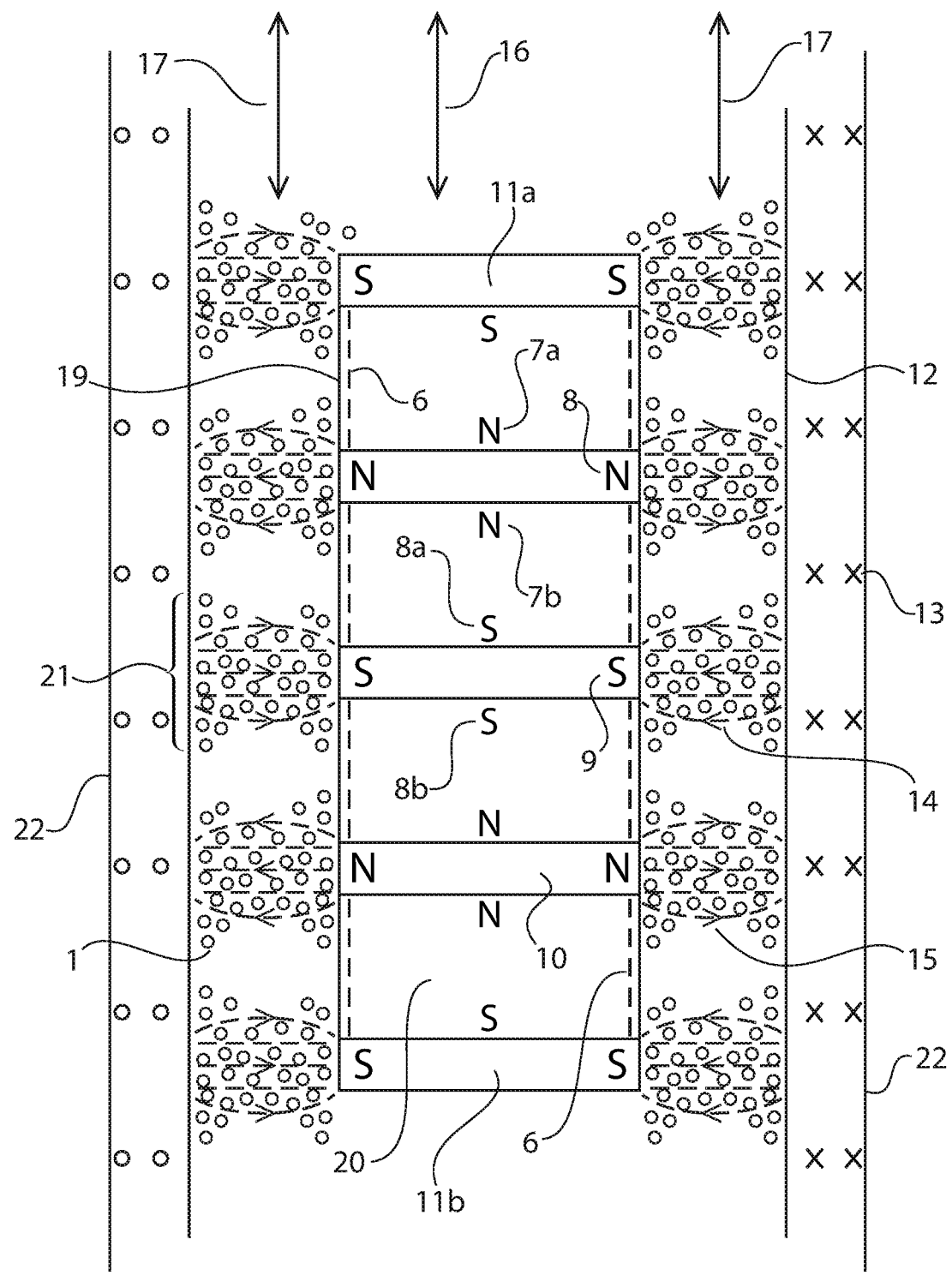
FIG. 3 is a cross-sectional view of a linear energy generator that includes a magnetic lubricant in accordance with an embodiment of the present invention.

Referring now to FIG. 3, a vertically oriented LEG is shown that can make up the energy-conversion mechanism of the WEC. The LEG may be lubricated by an embodiment of this invention. Only the nanoparticles 1 are shown, but a magnification of the distribution of the iron particles in FIG. 3 would show the structural arrangement described above in FIG. 2B. The vertically oriented LEG includes an outer shell 22 that may be formed from, e.g., plastic, non-corrosive stainless steel alloy, or carbon fiber/composite fiber. An inner magnet sliding tube 12 is formed from, e.g., plastic, a non-magnetic metal or metal alloy such as stainless steel, brass, or copper, or plastic or carbon fiber/composite. A field coil array (FCA) 13 includes coil windings (the stator). A moving permanent magnet array (PMA) 19 (the rotor) is positioned within the outer shell 22 and magnet sliding tube 12. The interior of the LEG, enclosed by outer shell 22, may be a complete vacuum, a partial vacuum of air, or an atmosphere of any inert gas such as nitrogen, argon, neon, and so forth at varying gas pressure.

To produce effective magnetic lubrication, the iron nanoparticles may have the following qualities: they may have a largest dimension between about 500 nm and about 3000 nm; they may be smooth, spheroidal, ellipsoid, or oblate spheroidal in shape or some approximation thereof, to allow easy sliding, slipping, and rolling over each other; they may be pure iron of at least 99% purity and not oxides of iron to maximize magnetic attraction of the lubricant to the PMA and also allow a maximal transfer of the magnetic field across the lubricant by giving the lubricant the highest magnetic permeability and lowest magnetic reluctance possible to the passage of the magnetic field; they may be coated at all times with the liquid phase component of the lubricant to avoid exposure to oxygen and water vapor to avoid corrosion to rust as well as reversion of the iron particles back to an abrasive nature; they may be large enough so that they are attracted strongly by magnetic fields; and the density of the nanoparticles 1 should not be so high so as to lead to an insufficient coating of the particles by the liquid phase component of the lubricant.

The nanoparticles 1 align themselves with the magnetic fields emanating out of N and S poles 8 and 9 respectively. It does not matter whether the magnetic field lines 15 are going outward from an N field 8 of PMA 19 or are lines 14 going inward toward an S field 9 of PMA 19. Furthermore, it does not matter if the magnetic field lines go from right to left or left to right. In either case, the magnetic nanoparticles 1 will line up in a linear fashion as per FIG. 2B and as shown in the aggregation of nanoparticles by each magnetic pole of PMA. The magnets with their repulsive magnetic poles are held together by various mechanical means, within the mechanical structure of the PMA, that are not shown.

The aggregate of iron nanoparticles 1 under each magnetic pole will take the shape of a bi-meniscus structure 21 due to adhesional forces at the PTFE coating 6 at the surface of the PMA magnets. The PMA is made up of rare earth magnets 20, of which four are shown, separated by inner pole pieces 10, of three are shown, as well as two end pole pieces 11A and 11B at each end of the PMA. Likewise, at the inner surface of the magnet sliding tube 12, adhesional forces cause the iron particles to line up in a bi-meniscus structure 21. The concentration of nanoparticles 1 is larger under the magnetic poles of the PMA, such as N pole 8 and S pole 9, and there are relatively few nanoparticles 1 over the middle portion of each magnet. The nanoparticles 1, along with both the rest of the solid phase component particles including GNP particles 4, MDS particles 2, and PTFE particles 5, as well as the liquid phase component, PFPE 3, are held in place from dripping down to the bottom of the generator by the magnetic fields of PMA 19. As long as the iron nanoparticles 1 are held in a given position, the other components of the lubricant that coat the iron particles will also be held in that given position by cohesive forces within the lubricant, between the iron particles and the other components of the lubricant. The iron particles and the magnetic lubricant will remain stationary for an unlimited amount of time as long as the PMA is stationary. The nanoparticles 1 in the magnetic lubricant may be on the inside walls of the magnet sliding tube 12, and the bank of coils that make up the field coil array (FCA) 13, that generate the electricity as the magnetic fields move through them, are on the outside surface of magnet sliding tube 12.

When the magnetic PMA rotor begins to move as a result of ocean wave action on the generator, the magnetic fields emanating out of the PMA will move in step with the rotor movement. The moving magnetic fields will pull on the lubricant aggregate concentrated and adjacent to each magnetic pole, and the iron nanoparticles 1 will easily move in step, because they are well lubricated with the rest of the components of the magnetic lubricant matrix and they will easily slip, slide and roll over each other while they are remaining their orientation in the moving magnetic field. The movement of the nanoparticles 1 with the moving magnetic field moves the rest of the magnetic lubricant matrix, both the liquid phase component and the solid particulate phase component, along with the moving magnetic fields and the moving PMA rotor. As the PMA rotor oscillates in the vertical direction with the vibrational ocean wave energy applied to the generator, the magnetic lubricant will move with it. Thus there will be continuous gentle agitation of the lubricant which will prevent undesirable clumping of the nanoparticles 1, will keep the magnetic lubricant matrix uniform and well mixed at all times, the generator will always remain self-lubricating, and the lubricant will never drip down to the bottom of the generator. This dripping down to the bottom of the generator can be prevented from happening by insuring that the ratio composition by weight of the liquid phase component to the composition by weight of the solid phase component of the magnetic lubricant is not excessively high, that is, not in excess of a preferable 45%. For horizontal oriented generators, the restriction on the percentage of the solid phase component can be relaxed, as vertical lubricant dripping does not occur and the magnetic lubricant can have the consistency of oil rather than a paste or a grease.

As the magnetic fields move, the magnetic lubricant moves relative to the magnet sliding tube walls which is part of the generator housing, and thus the magnetic lubricant moves relative to the stator of the generator which contains the coil armature of the generator. At the same time, the magnetic lubricant does not move relative to the PMA rotor, because the lubricant moves along with it. In vertically oriented LEGs, where the PMA is stationary and is fixed to the generator frame of housing, thus where the PMA is actually the stator, and where the coils are fixed to the magnet sliding tube which slides up and down against the PMA making the coils the rotor, the magnetic lubricant does not move relative to the PMA stationary stator, but moves along and relative to the magnet sliding tube as that tube and the coils on the outside of it move relative to and past the stationary PMA stator. Hence, the magnetic lubricant functions in exactly the same way to produce lubrication in the same exact manner whether or not the LEG has the PMA as a rotor (with the FCA windings being the stator) or the PMA is the stator (with the FCA windings being the rotor).

It is important to note that, if a regular lubricant without a magnetic component were being used, at each wave trough where the PMA rotor would reach its lowest position in the generator during the wave cycle, a portion of that lubricant would be left behind, causing the steady migration of the lubricant toward the bottom of the generator. The inclusion of the magnetic nanoparticles carries the lubricant back upward as the PMA moves higher off its trough in the vibration cycle and the lubricant thus does not collect on the walls at the lowest position reached by the PMA.

As previously explained, by keeping the liquid phase component to less than about 50% of the composition by weight, the viscosity of the lubricant can be maintained to prevent dripping due to gravity. However, it is possible to use this magnetic lubricant in the horizontal direction, for example in LEGs and WECs that harvest ocean wave energy in the horizontal direction as well. Under these circumstances, the pressure of the sliding magnets against the magnet sliding tube is much greater than in the vertically oriented LEG. In such embodiments, the concentration by weight of the iron nanoparticles can be kept much lower, for example in the range of about 10% or less, to prevent them from being compacted excessively together by the weight of the PMA on top of them. However, because there is no vertical drip condition to be concerned about for horizontal LEGs, the concentration of the liquid phase component of the magnetic lubricant of the by weight percentage can be as high as 90%.

The liquid phase component of the magnetic lubricant should have certain properties. First, the liquid phase component should be chemically inert and unreactive with the magnetic nanoparticles and anything else within its environment inside the generator. Second, it should be totally non-volatile, even in a vacuum, such that the liquid component does evaporate over a period of many years. Third, it should be of an appropriate viscosity. If the viscosity is too low, it could not function in a vertical linear electric generator. If the viscosity is too high, it would not allow the introduction of the magnetic nanoparticles in sufficient quantities to give the magnetic attractive effect to the lubricant, and the iron particles might not be sufficiently coated with the liquid phase component to ensure adequate lubricity.

Fourth, the liquid component should have a freezing and melting point that is compatible with the range of ocean water temperatures: 32 degrees Fahrenheit through 100 degrees Fahrenheit. Fifth, it should be able to coat iron particles in a complete and uniform manner, either by itself or when it is mixed with other lubricating additives, and be capable of keeping the solid phase components in a stable matrix with the liquid phase lubricant.

Sixth, it should show resistance to decomposition over the long term. Seventh, it should be compatible and non-reactive with the mechanical, electrical, and magnetic (magnets) components in the generator. Eighth, it should be convenient to apply to the interior of the generator. Ninth, it should retain its lubricity for decades allowing, a single lubricant application at the time of manufacture of the generator.

Tenth, it should have effective lubricity in an atmosphere that can be a total vacuum, a partial vacuum, or an atmosphere of inert gas such as helium, neon, nitrogen, and so forth. Eleventh, it should be environmentally friendly and should break down in the environment with time.

The present embodiments specifically contemplate the use of PFPE for the liquid phase lubricant component. PFPE satisfies all of the qualities described above. It is noted that PFPE has a long persistence in the environment. However, only small quantities are used in each LEG to mitigate this. Any member of the class of liquid fluorinated oils would perform similarly to PFPE and can be used instead. Synthetic lubricating oils, such as silicone oils or petroleum-based products may be used as well. Vegetable and animal-derived natural oils, meanwhile, do not have sufficiently long lifetimes of operation before degradation.

The present embodiments have been tested to determine the effectiveness of the magnetic lubricant. First, a magnetic lubricant having a composition according to the specifically contemplated concentrations described above for the ingredients of the lubricant was tested in several vertically oriented LEGs. The present embodiments provided excellent lubrication of the moving parts of the generator.

Second, an untethered aluminum foil surface was used to assess the friction of a the cylindrical surface of a cylinder magnet being pushed across the aluminum surface without any lubricant. The magnet would not slide over the surface and the aluminum foil surface was pushed along with the magnet. The same result was obtained with pure iron particles placed on the surface of the aluminum. However, when these iron particles were mixed within the magnetic lubricant as described above, the frictional resistance to the magnet moving over the aluminum foil dropped and the magnet was able to be moved over the surface of the untethered piece of aluminum foil without moving the foil, indicating excellent lubricity, marked reduction in frictional forces, and no hindering of the lubricity by the inclusion of the iron particles. Also observed was a positive differential lubricity effect when the solid phase component of the lubricant included particles such as PTFE, and GNP in addition to the iron particles, relative to the iron particles alone.

Next, more precise analytical testing was performed over a three-year period. First, a quantity of the magnetic lubricant was spread over an aluminum surface and exposed to normal room temperature and humidity conditions. The magnet sliding test, described above, was run every three months and there was no decrease in lubricity. Furthermore, there were no signs of rust formation and corrosion caused by oxygen and water vapor in the room atmosphere of the laboratory. After this three year testing program, a quantity of the magnetic lubricant was introduced into a vertically oriented generator and the lubricity was found to provide excellent lubrication, with no dripping of the lubricant toward the bottom of the generator.

Another test of three years in duration was performed, where a quantity of the magnetic lubricant was placed on an aluminum foil surface and the treated aluminum surface with the lubricant was placed inside a sealed plastic bag with a sponge, saturated with water, to produce an atmosphere of 100% humidity. Three test bags were prepared. After three years of observation, two of the test bags had absolutely no red rust corrosion, and the third had a tiny 3 mm area of red rust corrosion where the lubricant had touched the surface of the sponge. Every 3 to 6 months, the sponge in each bag was re-saturated with water to insure the continuance of the 100% humidity condition. This further testing of the magnetic lubricant is still ongoing, but sufficient evidence gathered by the testing so far indicates that the present embodiments of the magnetic lubricant are immune to evaporation, loss of lubricity, loss of magnetic attraction to magnetic fields, and damage to red rust oxidation and corrosion by oxygen and water vapor.

Although the present embodiments are described in the specific context of LEGs that make use of moving magnets in particularly corrosive and difficult to access environments, those having ordinary skill in the art will be able to apply the present principles in other contexts and applications.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A linear energy generator, comprising:
a field coil array that includes one or more coils of wire contained within a sealed generator housing and wrapped around a vertical tube;
a permanent magnet array, positioned within the vertical tube, that includes a plurality of magnets that move relative to the field coil array to generate electricity;
a magnetic lubricant between the vertical tube and the permanent magnet array, having sufficient viscosity and magnetic susceptibility to adhere to the permanent magnet array without dripping, that comprises:
a solid phase component that includes ferromagnetic particles; and
a liquid phase component that coats the ferromagnetic particles to prevent corrosion and to improve lubricity of the solid phase component.

2. The linear energy generator of claim 1, wherein the paramagnetic particles include particles formed from iron having a purity of 95% or greater.

3. The linear energy generator of claim 1, wherein the ferromagnetic particles include particles having a largest dimension between 500 nm and 3000 nm and that have a shape that is spheroidal, ellipsoidal, or an approximation thereof.

4. The linear energy generator of claim 1, wherein the solid phase component further includes particles formed from one or more materials selected from the group consisting of graphene nanoplatelets, molybdenum disulfide, polytetrafluoroethylene, and non-cubic boron nitride.

5. The linear energy generator of claim 1, wherein the liquid phase component includes a material selected from the group consisting of polyfluoropropylene ether, synthetic silicone oils, and synthetic non-fluorinated hydrocarbon oils.

6. The linear energy generator of claim 1, wherein the ferromagnetic particles have a concentration by weight in the magnetic lubricant between 10% and 40%.

7. The linear energy generator of claim 1, wherein the ferromagnetic particles have a concentration by weight in the magnetic lubricant of about 30%.

8. The linear energy generator of claim 1, wherein the ferromagnetic particles of the solid phase component include particles formed from a material selected from the group consisting of mu-metal, permalloy, supermalloy, supermumetal, and other alloys of nickel, cobalt, and iron.

9. The linear energy generator of claim 1, wherein the magnetic lubricant is a grease.

10. The linear energy generator of claim 1, wherein the viscosity is constant under operational conditions.

11. The linear energy generator of claim 1, wherein the solid phase component is kept in suspension in the liquid phase component by continuous agitation from the moving magnet.

12. The linear energy generator of claim 1, wherein the generator housing is evacuated and hermetically sealed to prevent contamination by external elements.

13. The linear energy generator of claim 1, wherein the plurality of magnets are coated with polytetrafluoroethylene (PTFE), and wherein the ferromagnetic particles of the solid phase component are coated with PTFE, such that friction between the plurality of magnets and the ferromagnetic particles is minimized.

14. The linear energy generator of claim 1, wherein the magnetic lubricant does not include a surfactant.

15. A linear energy generator, comprising:
a hermetically sealed and evacuated generator housing;
a field coil array that includes one or more coils of wire contained within the generator housing and wrapped around a vertical tube;
a permanent magnet array, positioned within the vertical tube, that includes a plurality of magnets that are coated with polytetrafluoroethylene (PTFE) and that move relative to the field coil array to generate electricity;
a magnetic grease between the vertical tube and the permanent magnet array, having sufficient viscosity and magnetic susceptibility to adhere to the permanent magnet array without dripping, that does not include a surfactant, and comprises:
a solid phase component that includes ferromagnetic particles that are coated with PTFE; and
a liquid phase component that coats the ferromagnetic particles to prevent corrosion and to improve lubricity of the solid phase component.

* * * * *